(12) United States Patent
Kleen et al.

(10) Patent No.: US 10,150,484 B2
(45) Date of Patent: Dec. 11, 2018

(54) DEVICE FOR DISPLAYING INFORMATION ABOUT AN IMMINENT TAKEOVER OF MANUAL CONTROL OF A VEHICLE

(71) Applicant: VOLKSWAGEN AG, Wolfsburg (DE)

(72) Inventors: Andro Kleen, Braunschweig (DE); Johannes Rhede, Berlin (DE); Marc-Michael Meinecke, Sassenburg (DE); Daniel Ricknäs, Stockholm (SE)

(73) Assignee: Volkswagen AG (DE)

( * ) Notice: Subject to any disclaimer, the term of this patent is extended or adjusted under 35 U.S.C. 154(b) by 92 days.

(21) Appl. No.: 15/026,619

(22) PCT Filed: Sep. 30, 2014

(86) PCT No.: PCT/EP2014/070923
§ 371 (c)(1),
(2) Date: Apr. 1, 2016

(87) PCT Pub. No.: WO2015/049232
PCT Pub. Date: Apr. 9, 2015

(65) Prior Publication Data
US 2016/0236692 A1 Aug. 18, 2016

(30) Foreign Application Priority Data

Oct. 1, 2013 (DE) .................. 10 2013 219 888

(51) Int. Cl.
*B60Q 1/00* (2006.01)
*B60W 50/14* (2012.01)
(Continued)

(52) U.S. Cl.
CPC ............. *B60W 50/14* (2013.01); *B42D 9/004* (2013.01); *B60W 30/12* (2013.01); *B60W 30/16* (2013.01); *B60W 2050/146* (2013.01)

(58) Field of Classification Search
CPC ...... B60W 50/14; B60W 30/12; B60W 30/16; B60W 2050/146; B42D 9/004
(Continued)

(56) References Cited

U.S. PATENT DOCUMENTS 6,226,570 B1 * 5/2001 Hahn .................. B60K 28/066
701/1
7,321,818 B2 * 1/2008 Michi ................ B60K 31/0008
180/169
(Continued)

FOREIGN PATENT DOCUMENTS

DE          19539799 A1    5/1996
DE      102004005229 A1    8/2005
(Continued)

OTHER PUBLICATIONS

Search Report for International Patent Application No. PCT/EP2014/070923; dated Mar. 20, 2015.

*Primary Examiner* — Daryl Pope
(74) *Attorney, Agent, or Firm* — Barnes & Thornburg LLP

(57) ABSTRACT

A device displaying information about an imminent takeover of manual control of a vehicle. The device includes a radio receiving apparatus and a controller, and a projection unit, a vibration unit or a display. The radio receiving apparatus receives the information by radio. The projection unit projects the information by lighting of the projection unit, while the vibration unit is activated by the device in accordance with the receipt of the information. The information is displayed on the display together with additional information.

24 Claims, 3 Drawing Sheets

(51) Int. Cl.
 *B42D 9/00* (2006.01)
 *B60W 30/12* (2006.01)
 *B60W 30/16* (2012.01)

(58) Field of Classification Search
 USPC ...................... 340/425.5, 438, 439
 See application file for complete search history.

(56) References Cited

U.S. PATENT DOCUMENTS

| | | | | |
|---|---|---|---|---|
| 9,248,834 | B1* | 2/2016 | Ferguson | B60W 30/09 |
| 2009/0267921 | A1* | 10/2009 | Pryor | B60K 35/00 |
| | | | | 345/177 |
| 2010/0075655 | A1* | 3/2010 | Howarter | B60R 25/2009 |
| | | | | 455/420 |
| 2010/0324797 | A1* | 12/2010 | Fritz | B62D 15/026 |
| | | | | 701/96 |
| 2011/0022247 | A1* | 1/2011 | Stahlin | B60W 30/16 |
| | | | | 701/1 |
| 2011/0025584 | A1* | 2/2011 | Nishigasako | G02B 27/01 |
| | | | | 345/76 |
| 2012/0110466 | A1* | 5/2012 | Tan | G05B 23/0272 |
| | | | | 715/744 |
| 2012/0169526 | A1* | 7/2012 | Reilhac | B60W 50/0098 |
| | | | | 342/70 |
| 2013/0073115 | A1* | 3/2013 | Levin | A61B 5/18 |
| | | | | 701/1 |
| 2013/0083679 | A1* | 4/2013 | Krishnaswamy | G08G 1/093 |
| | | | | 370/252 |

FOREIGN PATENT DOCUMENTS

| | | |
|---|---|---|
| DE | 102007029482 A1 | 1/2009 |
| DE | 102008061649 A1 | 12/2009 |
| DE | 102010001581 A1 | 8/2011 |
| DE | 102011075299 A1 | 11/2012 |
| DE | 102011082375 A1 | 3/2013 |
| DE | 102011112599 A1 | 3/2013 |
| DE | 102012201513 A1 | 8/2013 |
| EP | 0913802 A2 | 5/1999 |

\* cited by examiner

DEVICE FOR DISPLAYING INFORMATION ABOUT AN IMMINENT TAKEOVER OF MANUAL CONTROL OF A VEHICLE

PRIORITY CLAIM

This patent application is a U.S. National Phase of International Patent Application No. PCT/EP2014/070923, filed 30 Sep. 2014, which claims priority to German Patent Application No. 10 2013 219 888.4, filed 1 Oct. 2013, the disclosures of which are incorporated herein by reference in their entirety.

FIELD

Illustrative embodiments relate to a device for displaying information about an imminent takeover of manual control of a vehicle which is being driven automatically.

SUMMARY

An automatic driving function of a vehicle allows the driver to perform secondary tasks. When system limits of the driving function are reached or in the event of faults occurring, the driver is requested to take back manual control of the vehicle.

Disclosed embodiments improve the changeover from automatic driving of the vehicle back to manual control of the vehicle by the driver.

BRIEF DESCRIPTION OF THE FIGURES

Disclosed embodiments will be described in detail with reference to the figures.

DETAILED DESCRIPTION OF THE DISCLOSED EMBODIMENTS

Figure 1:
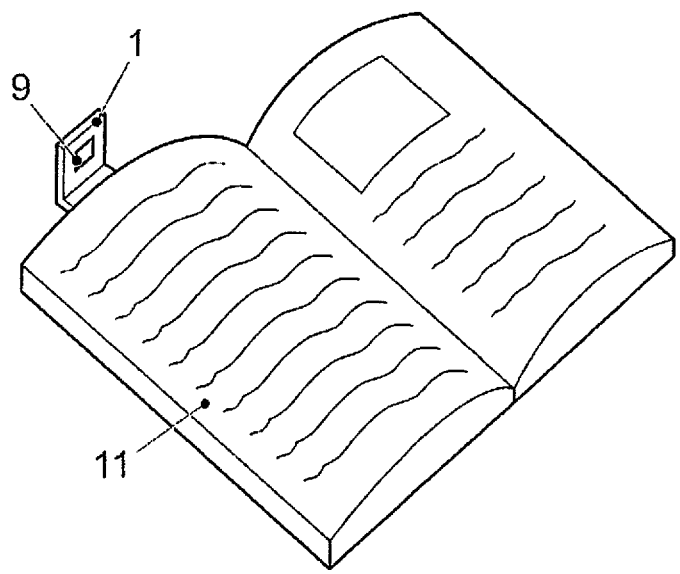
FIG. 1 shows a device as a bookmark with a projection unit.

A first device for displaying information about an imminent takeover of manual control of a vehicle is provided within the scope of the disclosed embodiments. In this case, the first device comprises a radio receiving apparatus, a controller and a projection unit. The radio receiving apparatus is designed to receive the corresponding information by radio. The projection unit, which comprise lighting means, is designed to project the information with the aid of the lighting means.

In this case, the lighting means can be based on laser technology, so that the information is projected using a laser beam which is generated by the lighting means. In this case, the information can be projected onto any desired object, for example, onto a book or a newspaper, and therefore the first device can be used as a bookmark.

A second device for displaying information about an imminent takeover of manual control of a vehicle is also provided within the scope of the disclosed embodiments. In this case, the second device comprises a radio receiving apparatus, a controller and a vibration unit. The radio receiving apparatus is designed to receive the information by radio. The second device is designed to activate the vibration unit depending on the received information.

The second device is able to transmit vibrations, for example, by direct physical contact, so that the driver can also be informed of the imminent takeover of the vehicle when he is sleeping, with his eyes closed and/or when listening to music. In this case, the vibration unit can be attached to the driver by way of an armband or a badge.

In this case, the second device can also comprise a display, so that the information can be displayed on this display.

As a result, it is possible for the driver to be informed of the imminent takeover of the vehicle by means of vibrations and to be able to obtain an overview of the current driving situation of his vehicle by looking at the display.

A third device for displaying information about an imminent takeover of manual control of a vehicle is also provided within the scope of the disclosed embodiments. In this case, the third device comprises a radio receiving apparatus, a controller and a display. The radio receiving apparatus is designed to receive the information by radio. In the third device, the information includes an item of additional information to estimate a degree of urgency of the takeover (for example, a time period by which the takeover has to be concluded). The third device is designed to display the information, which includes the additional information, on the display.

The information which is received by the third device and is displayed on the display is not limited to the request to the driver to take over the vehicle. Instead, the information includes an item of additional information to, in particular, quickly detect the driving situation of the vehicle. With the aid of the additional information, the driver is able to quickly estimate the priority or degree of urgency with which he has to take back manual control of the vehicle.

According to at least one disclosed embodiment of all of the devices described here, the information includes at least one item of additional information which is displayed by the respective device together with the information. In this case, the at least one item of additional information is selected from the following group:

a current speed of vehicles in the area surrounding the vehicle. In this case, the speed can be displayed on the one hand, as it were, as an attribute of an animated object which is displayed on the display and represents the vehicle in question. The dynamics of the surrounding vehicles can be estimated on the basis of this additional information. Another option involves depicting the average speed of the vehicles which are located in the area surrounding the vehicle as a graphical illustration (for example, as a pattern or as a colored-in portion) on the display. On the basis of the graphical illustration, the driver is then able to quickly detect whether the vehicles which are located in the area surrounding the vehicle are moving at a high or at a low speed A degree of density which indicates how many vehicles are located in a lane, which is adjacent to a current lane of the vehicle, per unit length. In other words, this additional information indicates whether there are a large number or a small number of vehicles located next to the vehicle. This information can be displayed, for example, by vehicles which are located in the area surrounding the vehicle being depicted on the display as animated objects. In the case of this additional information, there is also an option to display the degree of density as a graphical illustration (for example, as a pattern or as a colored-in portion) of the respective lane on the display. On the basis of the graphical illustration, the driver is then able to quickly detect whether there are a relatively large number or a relatively small number of vehicles located in the respective adjacent lane.

A proportion of vehicles in the area surrounding the vehicle, which vehicles are designed with Car2X technology. This additional information can be displayed, for example, as a percentage figure (percentage of vehicles which are equipped with Car2X technology). However, according to the disclosed embodiments, it is also possible to represent this additional information by virtue of a graphical illustration on the display. The higher the proportion of vehicles which are designed with Car2X technology, the lower the risk of an accident is estimated to be.

A quality or availability of an infrastructure of a road which is currently being driven on by the vehicle in respect of the Car2X technology. This additional information indicates whether the Car2X technology is available in the area surrounding the carriageway which is currently being driven on by the vehicle and the level of performance of this Car2 technology. The higher the quality or availability of the Car2X technology in the area surrounding the carriageway on which the vehicle is being driven, the lower the probability of an accident is estimated to be.

An indication of a degree of utilization of the apparatus (for example, CPU, memory) of the vehicle which achieves automatic driving of the vehicle. This additional information can be provided, for example, by a percentage figure (percentage indication in respect of a maximum degree of utilization) and/or on the basis of indicating the identified control objects of the device for automatic driving. In this case, a control object is understood to mean an object which displays the cause of or the reason for a driving maneuver which is currently being executed by the vehicle or is to be executed by the vehicle in the near future. The greater the number of control objects that have to be taken into consideration, the higher the degree of utilization of the device is assessed to be.

Furthermore, further additional information, such as the probability of animals being expected to cross or an upcoming construction site for example, can be displayed on the display.

The display of a device can comprise organic light-emitting diodes (OLEDs) and/or can be designed as electronic paper (comprising E ink materials).

When OLEDs or electronic paper are/is used for the display, the device can be a bookmark, for example.

The radio receiving apparatus of any disclosed device can be designed to receive signals by means of
near-field communication (NFC), an international transmission standard for contactlessly exchanging data by radio technology over short distances,
Bluetooth and/or
WLAN.

In this case, it is likewise possible for the radio receiving apparatus to be designed only for near-field communication, only for communication by means of Bluetooth or only for WLAN communication, so that, for example, communication with a device, which has these characteristics, by means of a mobile radio network is not possible.

A further device which is designed to display information about a driving situation of a vehicle which is designed, in particular, for at least partially automatic driving, can also be provided within the scope of the disclosed embodiments. This further device comprises a radio receiving apparatus, a controller and a display, wherein the radio receiving apparatus is designed to receive the information, and wherein the display is designed to display the information. In this case, the information includes at least one item of information from amongst a quantity of information, which item of information includes, firstly, the above-described item of additional information and, secondly, the information about the imminent takeover of manual control of the vehicle. In other words, the further device can also be designed only to display a specific number of items of additional information (and not to display the information about the imminent takeover).

The disclosed devices allow the incorporation of entertainment elements (for example, a book) which themselves do not have any technical requirements to display or at least give notice of the information about the imminent takeover. In other words, the disclosed embodiments allow the driver to use non-technical apparatuses (for example, a book) or to simply not pay attention, wherein the driver is nevertheless informed about the imminent takeover.

A system for displaying information about an imminent takeover of manual control of a vehicle is also provided within the scope of the disclosed embodiments. In this case, the system comprises one of the above-described devices and an apparatus which is arranged within the vehicle. The apparatus itself comprises a sensor, a controller and a radio transmitting apparatus. In this case, the sensor is designed to detect objects (in particular vehicles) in the area surrounding the vehicle. The apparatus is designed to automatically drive the vehicle (that is to say to drive the vehicle without any operation by a human). Furthermore, the apparatus is designed to identify the request for an imminent takeover of manual control by the driver depending on outputs from the sensor in a state in which the vehicle is being automatically driven, and to transmit the information about the imminent takeover to the disclosed device of the system with the aid of the radio transmitting apparatus.

The sensor of the apparatus can also be a plurality of sensors of different types (for example, a stereo camera, a radar and an ultrasound sensor). Furthermore, the apparatus can be designed to receive and/or to send Car2X data.

In other words, the system is firstly able to automatically drive the vehicle under certain conditions (for example, in a traffic jam). Secondly, the system can detect when certain conditions for automatic driving are no longer met, so that control of the vehicle has to be passed back to the driver. As soon as certain conditions for automatic driving are no longer met, the apparatus of the system transmits the information about the imminent takeover to the (mobile) device of the system.

In this case, the system is designed, in particular, to detect one or more additional items of information with the aid of the sensor, and to transmit this item/these items of additional information as a constituent part of the information to the device with the aid of the radio transmitting apparatus. In this case, the respective additional information can be selected from the following group:

A current speed of vehicles which are moving in the area surrounding the vehicle.

A degree of density which indicates how many vehicles are located over a predetermined carriageway length in a lane which is adjacent to the current lane of the vehicle.

A percentage of vehicles in the area surrounding the vehicle, which vehicles do not have Car2X technology.

An indication from which the degree of utilization of the apparatus for automatic driving can be derived. This indication can also be detected directly from the controller of the apparatus without a special sensor.

The disclosed embodiments are suitable for use in the field of motor vehicles. It goes without saying that the disclosed embodiments are not limited to this field of application and can also be used in rail-bound or track-guided vehicles and also aircraft and ships. Furthermore, the disclosed embodiments can also be used when using public transport, for example, for displaying information at stops and stations, by, in particular, the traffic situation around the stop or station in question or the traffic situation of a specific means of transport (for example, a bus) being displayed with the aid of the disclosed embodiments. Finally, the disclosed embodiments can be realized by means of a smartphone, wherein, in this case, location and/or position descriptions can be obtained via the smartphone by means of mobile radio.

FIG. 1 shows a projection device 1 which is attached to a book 11 as a bookmark. In this case, the projection device 1 comprises, in addition to a radio receiving apparatus and a controller, neither of which are illustrated in FIG. 1, a projection unit 9. When the radio receiving apparatus receives information about an imminent takeover of manual control of a vehicle by radio, this information is forwarded to the projection unit 9 with the aid of the controller. This projection unit 9 then projects the corresponding information onto the book with the aid of lighting means of the projection unit. In this way, the driver is informed about the imminent takeover of manual control.

Figure 2:
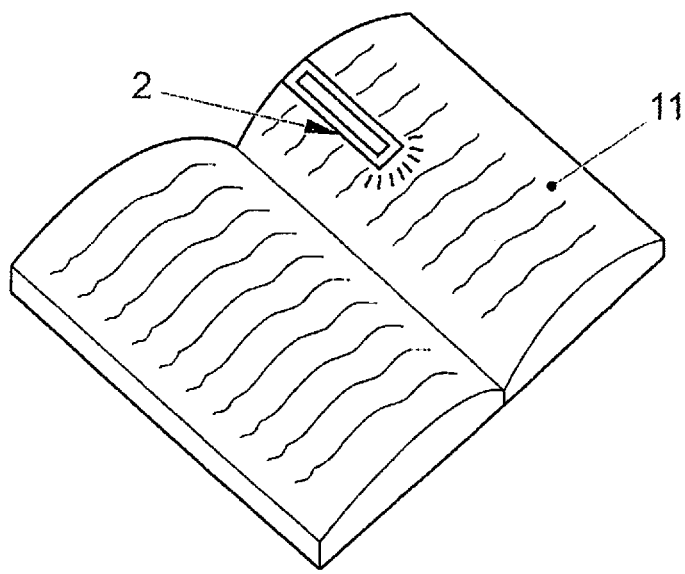
FIG. 2 shows a device as a bookmark which is realized as a flat display.

FIG. 2 shows a device which is designed as a bookmark 2. The bookmark 2 comprises, in addition to a radio receiving apparatus and a controller (not illustrated), a display which itself can be designed as electronic paper or can comprise organic light-emitting diodes. This bookmark 2 can be used as a normal bookmark when reading a book. As soon as the bookmark 2 detects the information about the imminent takeover, the bookmark 2 depicts this information on the display, so that the driver is informed about the imminent takeover with the aid of the bookmark 2 when reading the book.

Figure 3:
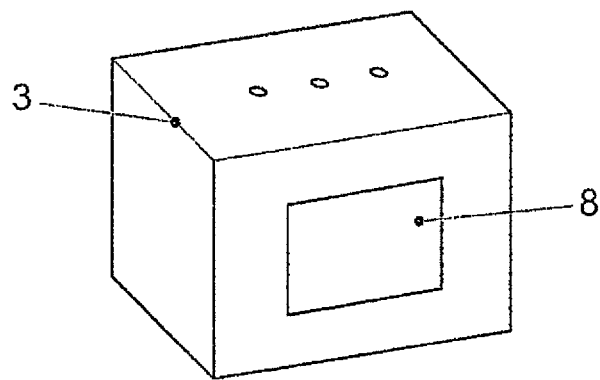
FIG. 3 shows a device on its own.

In addition to disclosed embodiments which can be used in conjunction with books, newspapers or magazines as are shown in FIGS. 1 and 2, FIG. 3 shows a device 3 which can be used on its own. The device 3 comprises, in addition to a radio receiving apparatus and a controller (not illustrated), a display 8 on which the information can also be displayed together with additional information.

The device 3 can be arranged in the field of view of the driver at any time, so that the driver is informed about the imminent takeover of manual control at an early stage by means of the device 3 even if the driver is not looking at the dashboard or the front windshield of the vehicle. In this case, the device 3 can also continuously provide information about the current driving situation of the vehicle in the surrounding area by means of displaying corresponding information on its display 8.

Figure 4:
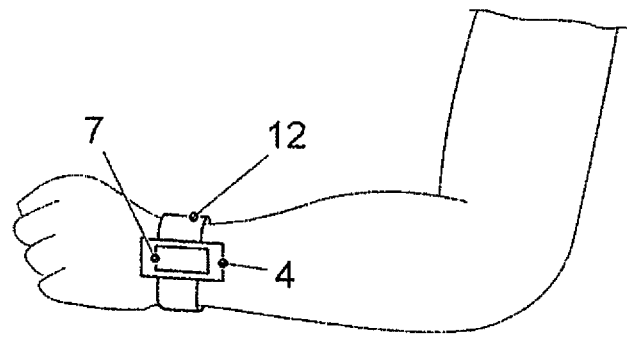
FIG. 4 shows a device with a vibration unit.

FIG. 4 shows a device 4 which can transmit vibrations by direct physical contact and therefore is able to effectively inform the driver about the imminent takeover even when the level of attention being paid by the driver is very low (, when he is sleeping). The device 4 comprises, in addition to a radio receiving apparatus, a controller and a vibration unit (not illustrated), a display 7 and is attached to an armband 12 which, like a watch, is arranged around the wrist of the driver.

When the device 4 detects the information about the imminent takeover by radio with the aid of its radio receiving apparatus, the vibration unit is activated with the aid of the controller to transmit the information to the driver. In this case, the information can be displayed on the display 7 together with corresponding additional information to allow the driver to quickly detect the current driving situation of his vehicle.

Figure 5:
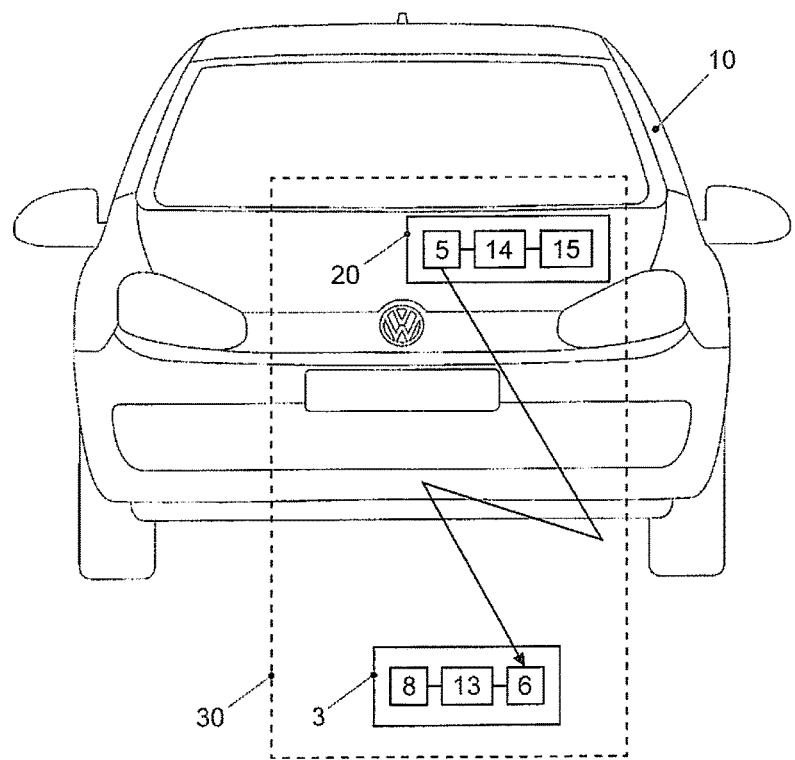
FIG. 5 shows a system having a device, together with a vehicle.

FIG. 5 shows a system 30 having a device 3. The device 3 comprises a radio receiving apparatus 6, a controller 13 and a display 8. The system 30 comprises, in addition to the device 3, an apparatus 20 which is designed to automatically drive the vehicle 10. The apparatus 20 comprises a controller 14, a sensor 15 and a radio transmitting apparatus 5. When the apparatus 20 detects, in the state of automatic driving, that a condition for automatic driving is no longer met, so that the driver has to manually take over the vehicle in a short time, the apparatus 20 transmits a corresponding item of information to the radio receiving apparatus 6 of the device 3 by radio with the aid of its radio transmitting apparatus 5. The device 3 processes this information with the aid of its controller 13 and displays the information on the display 8 to inform the driver about the imminent takeover of manual control of the vehicle 10.

In this case, the apparatus 20 is a constituent part of the vehicle 10, while the mobile device 3 is at least not a permanent constituent part of the vehicle 10.

An automatic driving function of a vehicle allows the driver to perform secondary tasks. When system limits of the driving function are reached or in the event of faults occurring, the driver is requested to take back manual control of the vehicle.

Disclosed embodiments improve the changeover from automatic driving of the vehicle back to manual control of the vehicle by the driver.

EP 0 913 802 A2 describes a motor vehicle having means for autonomously controlling the vehicle and having means for a vehicle user to communicate with a communication system. In this case, takeover information is transmitted to the communication means and displayed on a display device of the communication means when it is identified that manual vehicle control will become necessary.

LIST OF REFERENCE SYMBOLS

1 Projection device
2 Bookmark
3 Device
4 Device
5 Radio transmitting device
6 Radio receiving device
7 Display
8 Display
9 Projection unit
10 Vehicle
11 Book
12 Armband
13 Controller
14 Controller
15 Sensor
20 Apparatus
30 System

The invention claimed is:

1. A device for displaying information about an imminent takeover of manual control of a transportation vehicle, wherein the device comprises:
a radio receiving apparatus;
a controller; and
a projection unit configured for projection onto a surface of at least one non-technical entertainment element to inform the user about the imminent takeover of manual control of the transportation vehicle,
wherein the radio receiving apparatus receives the information about the imminent takeover of manual control of the transportation vehicle by radio, and
wherein the projection unit projects the received information about the imminent takeover of manual control of the vehicle onto the at least one non-technical entertainment element.

2. A device for displaying information about an imminent takeover of manual control of a transportation vehicle, wherein the device comprises:
a radio receiving apparatus;
a controller; and
a display,
wherein the radio receiving apparatus receives the information about the imminent takeover of manual control of the transportation vehicle by radio,
wherein the information about the imminent takeover of manual control of the transportation vehicle includes additional information for classifying a degree of urgency of the takeover, and
wherein the device displays the information about the imminent takeover of manual control of the transportation vehicle including the additional information on the display, the at least one item of additional information is selected from a group comprising:
a proportion of transportation vehicles in the area surrounding the vehicle, in which vehicles Car2X technology is installed;
a quality of an infrastructure of a road which is currently being driven on by the vehicle with respect to the Car2X technology; and
an indication of a degree of utilization of a device of the transportation vehicle for automatically driving the transportation vehicle.

3. The device of claim 1, wherein the device displays at least one item of additional information, wherein the at least one item of additional information is selected from a group comprising:
a current speed of transportation vehicles in the area surrounding the vehicle;
a degree of density which indicates how many transportation vehicles are located in a lane, which is adjacent to a current lane of the transportation vehicle, per unit length;
a proportion of transportation vehicles in the area surrounding the transportation vehicle, in which transportation vehicles Car2X technology is installed;
a quality of an infrastructure of a road which is currently being driven on by the transportation vehicle with respect to the Car2X technology; and
an indication of a degree of utilization of a device of the transportation vehicle for automatically driving the transportation vehicle.

4. The device of claim 2, wherein the display comprises organic light-emitting diodes, and/or is implemented as electronic paper.

5. The device of claim 1, wherein the radio receiving apparatus receives the information by near-field communication, Bluetooth and/or WLAN.

6. The system of claim 2, wherein the at least one item of additional information includes at least one of: a current speed of transportation vehicles in the area surrounding the transportation vehicle, and
a degree of density which indicates how many transportation vehicles are located in a lane, which is adjacent to a current lane of the transportation vehicle, per unit length.

7. The device of claim 1, wherein the projection unit includes a lazer generating a lazer beam for projection of the information about the imminent takeover of manual control of the transportation vehicle onto a non-technical surface of the non-technical entertainment element.

8. The device of claim 1, further comprising a vibration unit.

9. The device of claim 8, wherein the vibration unit includes at least one of an armband or badge.

10. The device of claim 1, wherein the device displays the additional information as a graphical illustration.

11. The device of claim 10, wherein the graphical illustration includes at least one of a pattern or a colored portion.

12. The device of claim 1, wherein the non-technical entertainment element includes a book.

13. The device of claim 2, wherein the display includes a projection unit for projection of the information about the imminent takeover of manual control of the transportation vehicle onto a surface.

14. The device of claim 13, wherein the projection unit includes a lazer generating a lazer beam for projection of the information about the imminent takeover of manual control of the transportation vehicle onto a surface.

15. The device of claim 2, further comprising a vibration unit activatable based on the information about an imminent takeover of manual control of the transportation vehicle.

16. The device of claim 2, wherein the radio receiving apparatus receives the information by near-field communication, Bluetooth and/or WLAN.

17. The device of claim 2, wherein the device displays the additional information as a graphical illustration.

18. The device of claim 17, wherein the graphical illustration includes at least one of a pattern or a colored portion.

19. A system for displaying information about an imminent takeover of manual control of a transportation vehicle, wherein the system comprises:
a transportation vehicle apparatus comprising at least one sensor, a controller, and a transmitting apparatus, wherein the at least one sensor detects objects in an area surrounding the transportation vehicle, wherein the transportation vehicle apparatus automatically drives the transportation vehicle without interaction from a user; and
a device for displaying information about an imminent takeover of manual control of the transportation vehicle, the device comprising a radio receiving apparatus, a controller, and a display, wherein the radio receiving apparatus receives the information about the imminent takeover of manual control of the vehicle by radio, wherein the information about the imminent takeover of manual control of the transportation vehicle includes additional information for classifying a degree of urgency of the takeover, and the device displays the information about the imminent takeover of manual control of the transportation vehicle including the additional information on the display, wherein the device displays the information about the imminent takeover of manual control of the transportation vehicle including the additional information on the display, the at least one item of additional information is selected from a group comprising:
- a proportion of transportation vehicles in the area surrounding the transportation vehicle, in which vehicles Car2X technology is installed;
- a quality of an infrastructure of a road which is currently being driven on by the transportation vehicle with respect to the Car2X technology; and
- an indication of a degree of utilization of the transportation vehicle apparatus for automatically driving the transportation vehicle.

20. The device of claim 19, wherein the display includes a projection unit for projection of the information about the imminent takeover of manual control of the transportation vehicle onto a surface.

21. The device of claim 19, further comprising a vibration unit activatable based on the information about an imminent takeover of manual control of the transportation vehicle.

22. The device of claim 19, wherein the radio receiving apparatus receives the information by near-field communication, Bluetooth and/or WLAN.

23. The device of claim 19, wherein the device displays the additional information as a graphical illustration.

24. The device of claim 23, wherein the graphical illustration includes at least one of a pattern or a colored portion.

* * * * *